US006829624B2

(12) United States Patent
Yoshida

(10) Patent No.: US 6,829,624 B2
(45) Date of Patent: Dec. 7, 2004

(54) DATA PROCESSING METHOD FOR DIGITAL CAMERA

(75) Inventor: Masanori Yoshida, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 408 days.

(21) Appl. No.: 10/058,089

(22) Filed: Jan. 29, 2002

(65) Prior Publication Data

US 2002/0112112 A1 Aug. 15, 2002

(30) Foreign Application Priority Data

Jan. 29, 2001 (JP) ........................................ 2001-019749

(51) Int. Cl.$^7$ ............................................. G06F 17/30
(52) U.S. Cl. ................................... 707/205; 348/231.4
(58) Field of Search ................................ 707/200, 205; 348/231.4

(56) References Cited

U.S. PATENT DOCUMENTS 6,334,025 B1 * 12/2001 Yamagami .................... 386/96
6,462,778 B1 * 10/2002 Abram et al. ................. 348/239
6,687,453 B1 * 2/2004 Sakamoto et al. ............ 386/46

OTHER PUBLICATIONS

Rangan et al, Designing File Systems for Digital Video and Audio, AMC SIGOPS Operating Systems Review, Sep. 1991, pp. 81–94.*

* cited by examiner

Primary Examiner—Jack Choules
(74) Attorney, Agent, or Firm—Birch, Stewart, Kolasch & Birch, LLP

(57) ABSTRACT

A data processing method for a digital camera that may record image data as image files and sound data as sound files on a storage medium, wherein sound files are classified into a sound memo file recorded in association with an image file, and a sound record file recorded independently. The image files and the sound record files are time-sequentially recorded in a recording directory on a storage medium, each being given a file-name that contains an individual file number representing the time sequence of recording. To discriminate between the image files and the sound files, an extender common to the image files or a second extender common to the sound files is attached to the file-name. The sound memo file is given the same file-name as that of an image file which the sound memo file is to be associated with, and is recorded in the same recording directory as the associated image file, though the extender common to the sound files is attached to the file-name of the sound memo file.

16 Claims, 12 Drawing Sheets

DATA PROCESSING METHOD FOR DIGITAL CAMERA

BACKGROUND OF THE INVENTION

1. Field of the Invention

The present invention relates to a data processing method for a digital camera that is provided with a photography mode for recording image data as an image file, a sound memo mode for recording sound data as a sound memo file in association with an appropriate image file, a sound recording mode for recording sound data as a sound record file independently of image data, and a reproduction mode for reproducing images or sounds.

2. Background Arts

Digital cameras have been widely used that convert optical images into digital image data through an imaging device, such as a CCD image sensor, and record a set of image data as an image file on a storage medium, such as a memory card. The images recorded on the storage medium may be reproduced on a display device of the digital camera, that is mostly an LCD panel. Some digital cameras are provided with a sound memo function for recording sounds or voices as a sound data file in association with an image file, or a voice recorder for recording sounds as a sound data file independently of image data. In that case, the digital camera is provided with a microphone for converting sounds into sound signals, and a speaker for reproducing the recorded sounds as well.

Since the image files and the sound files are recorded on the same storage medium, it is necessary to discriminate between the image files and the sound files. In order to record the image files and the sound files in different directories from each other on the same storage medium, data of linkage or correlation between a sound file and an image file must also be recorded on the storage medium when the sound file is to be associated with the image file. Such linkage data will increase the size or volume of data recorded on the storage medium. Moreover, when the image file or the sound file is to be reproduced, it is necessary to read out the linkage data concurrently to analyze it. So the linkage data will also increase the load on a data processing device of the digital camera in the reproduction mode.

On the other hand, in order to list up and reproduce the image files and the sound files in the sequence from the earlier recorded one to the later recorded one, or vise versa, regardless of whether it is an image file or a sound file, it is necessary to accompany data of a recording time or a recording sequence with each of the image files and the sound files when recording these files. In that case, however, if the recording directory for the image files and that for the sound files are different, it is necessary to rearrange the image files and the sound files into a series in accordance with the recording time or sequence data after read outing these files from the different directories. The rearranging process increases the processing load.

Even where the image files and the sound files are recorded in the same directory, if the linkage data indicating the correlation of some sound files with some image files is recorded together, an increase in the data size would not be avoidable, and it is necessary to analyze the linkage data, so the processing load would be raised.

SUMMARY OF THE INVENTION

In view of the foregoing, an object of the present invention is to provide a data processing method for a digital camera that avoids increasing the size or volume of data recorded on a storage medium, and reduces the load of data processing for reproduction of the image and sound files, without damaging handiness or user-friendliness of the digital camera.

To achieve the above and other objects, the present invention suggests a data processing method for a digital camera that may record image data as image files and sound data as sound files on a storage medium, wherein sound files comprise a sound memo file recorded in association with an image file, and a sound record file recorded independently, wherein a sound memo file to be associated with a designated image file is given a same file-name as the designated image file, and is attached with an extender common to the sound files, and is recorded in a same recording directory on the storage medium as the designated image file is recorded.

Since the same file name is given to the image file and the sound memo file when these files are associated with each other, while the sound memo file is attached with the extender common to the sound files, it is easy to detect the correlation between the image file and the sound memo file with reference to their file names, and discriminate the sound memo file from the image file with reference to the extender. It is also easy to discriminate between the sound record files and the sound memo file, because if there is not an image file having the same file name as a sound file in the same recording directory, that sound file can be determined as a sound record file.

According to a preferred embodiment, when an image file is selected from among files stored in a recording directory on a storage medium, a sound file having the same file-name as the selected image file has is automatically searched for among those files stored in the same recording directory, and is read out as a sound memo file associated with the selected image file.

According to another preferred embodiment, when a delete command is entered while an image is displayed on a display device of the digital camera on the basis of the selected image file, the selected image file is deleted and, if any, the sound memo file associated with the selected image file is also deleted automatically.

According to another aspect of the present invention, a data processing method for a digital camera that may record image data as image files and sound data as sound files on a storage medium, wherein sound files comprise a sound memo file recorded in association with an appropriate image file and a sound record file recorded independently, the data processing method comprising steps of determining a file number for a new image file such that the file number is not used for other image and sound files which are recorded in a recording directory on the storage medium; recording the new image file with an image file name in the recording directory, the image file name consisting of a file-name containing the file number in a predetermined format and a first extender common to any image files; determining a second file number for a new sound record file such that the file number is not used for other image and sound files which are stored in the recording directory; recording the new sound record file with a sound file name in the recording directory, the sound file name consisting of a file-name containing the second file number in the predetermined format and a second extender common to any sound files; recording a new sound memo file with a second sound file name in the recording directory, the second sound file name being obtained by attaching the second extender to a same file-name as that of an image file which the new sound memo file is to be associated with; discriminating between image files and sound files by the extenders attached to the file-names of these files; processing a sound file as a sound memo file when an image file having the same file-name as the sound file has is recorded in the same recording directory; and processing a second sound file as a sound record file when an image file having the same file-name as the second sound file has is not recorded in the same recording directory.

A file number for a new image file or a new sound record file is preferably obtained by adding "1" to a preceding file number that is given to the latest image file or the latest sound record file recorded in the recording directory. Then, the file numbers represent the time sequences of recording the respective image files and sound record files. So it becomes easy to reproduce the image files and the sound record files in a sequence relating to the recording time, regardless of whether the file is an image file or a sound record file.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
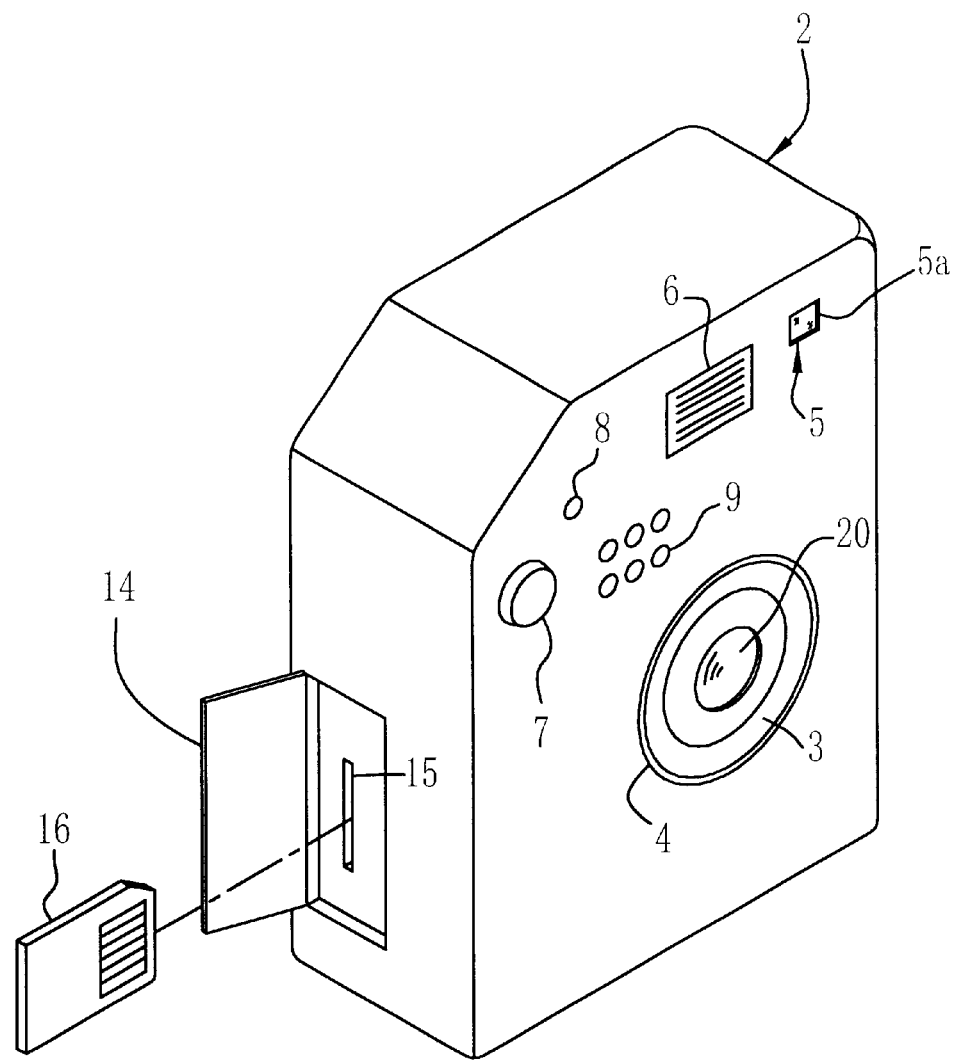
FIG. 1 shows a front perspective view of a digital camera embodying the method of the present invention.
Figure 2:
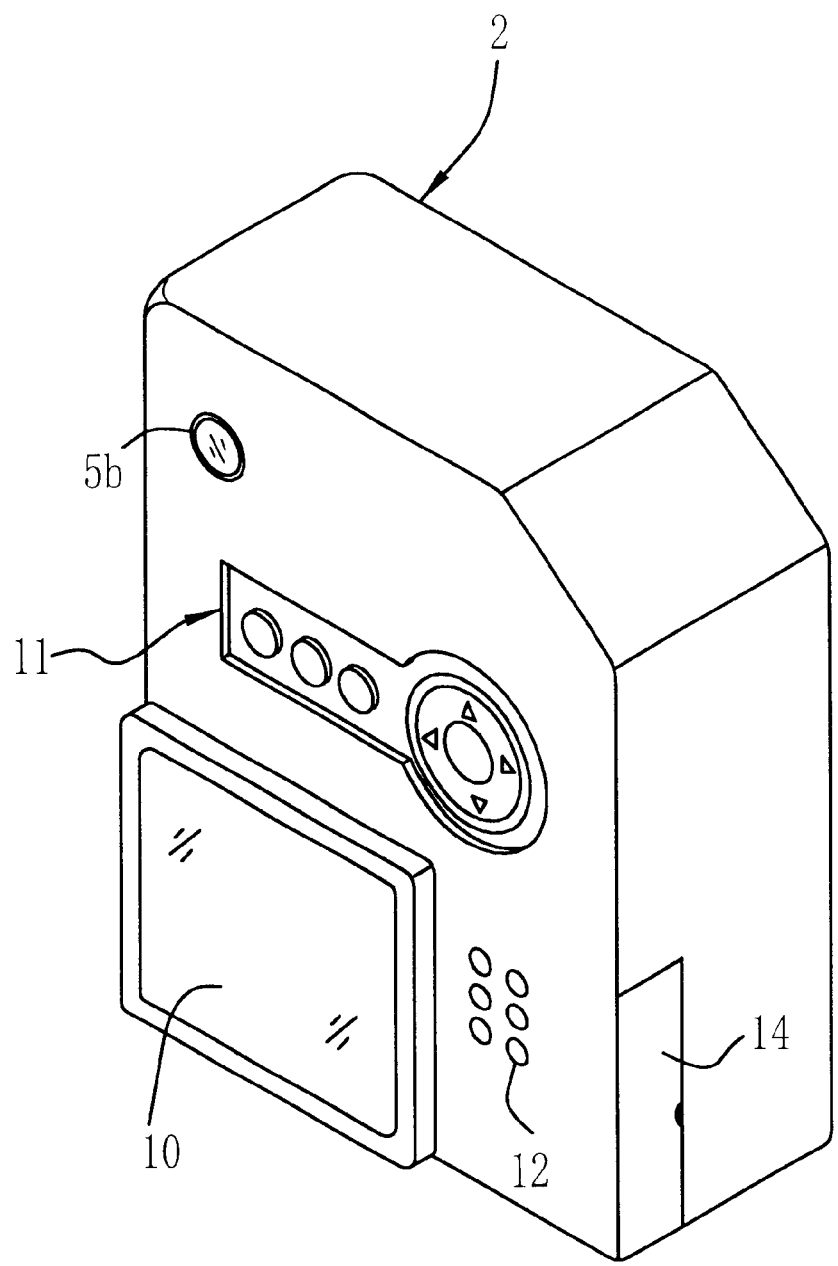
FIG. 2 shows a rear perspective view of the digital camera of FIG. 1.

A digital camera shown in FIGS. 1 and 2 has a camera body 2, and a lens barrel 3, an opening 4, an objective window 5a of an optical view finder 5, a flash projector 6, a release button 7, an LED 8 and holes 9 for a microphone 22 (see FIG. 4) are disposed on the front of the camera body 2. On the rear of the camera body 2 are disposed an eyepiece window 5b of the optical finder 5, an LCD 10, a control section 11 and holes 12 for a speaker 23 (see FIG.4). Sounds and voices are recorded through the microphone 22, and are reproduced through the speaker 23.

A door 14 is disposed on one side of the camera body 2. When the door 13 is open, a memory slot 15 is exposed, and a memory card 16 may be put in the memory slot 15. The memory card 16 can store image files and sound files.

The lens barrel 3 holds a taking lens 20, and may protrude out through the opening 4 when the digital camera is powered by operating the control section 11. A CCD image sensor 21 (see FIG. 4) is disposed behind the taking lens 20. When the release button 7 is pressed in a photography mode, image data of an optical image, that is formed at that moment on the CCD image sensor 21 through the taking lens 20, is written as an image file of a still image on the memory card 16 as set in the memory slot 15. In a sound recording mode, the release button 7 is used for starting or stopping recording sounds, as will be described in detail later.

The LED 8 blinks while a self-timer is working in the photography mode, or while sounds are being taken through the microphone 22, and are recorded as a sound file on the memory card 16. The sounds recorded on the memory card 16 may be reproduced through the speaker 23.

In addition to the optical viewfinder 5, the LCD 10 may be served as an electronic viewfinder that displays moving images of objects existing in a photographic field of the taking lens 20 in a real time fashion. The LCD 10 also displays still images based on the image data recorded on the memory card 16 in a reproduction mode.

Through the control section 11, the user can turn on or off the power source, switch over between the photography mode, the sound recording mode and the reproduction mode, and make other operations necessary for setting up data in the respective modes, selecting a file to reproduce, deleting a file, starting and stopping reproducing the recorded sounds and so on.

In the photography mode, the user may choose between an ordinary photography mode and an auto-memo mode. In the ordinary photography mode, when an image file is obtained by pressing the release button 7, merely the image file is written on the memory card 16. In the auto-memo mode, the digital camera automatically moves on to a sound memo mode immediately after the release button 7 is pressed to obtain an image file, so a sound file is produced from sounds taken through the microphone 22 immediately after the image file is obtained. Thus, in the auto-memo mode, an image file and a sound file are written on the memory card 16 in association with each other each time the release button 7 is pressed.

The user may choose the sound memo mode in the reproduction mode. In that case, a sound file is written on the memory card 16 in association with an image file that is selected in the reproduction mode from among already-stored image files. In the sound recording mode, the user may record sounds on the memory card 16 independently of the image files. In the present embodiment, the recording time is up to 30 seconds in the sound memo mode, whereas it is up to 1 hour in the sound recording mode. In the following description, when it is necessary to distinguish the sound file recorded in the sound recording mode from the sound file recorded in the sound memo mode, they are referred to as a sound record file and a sound memo file respectively.

Figure 3:
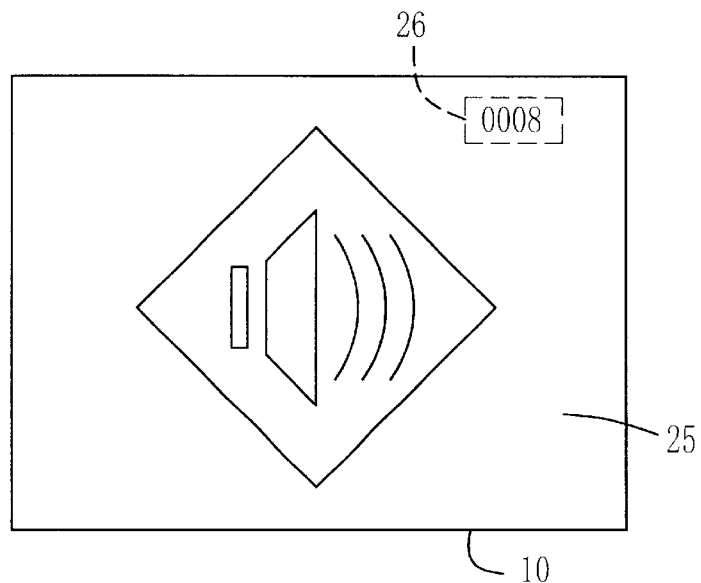
FIG. 3 shows an explanatory diagram illustrating a display condition on an LCD in a sound recording mode or while a sound record file is selected in a reproduction mode.

In the reproduction mode, the user may select an image file or a sound record file from among those files stored in the memory card 16, by operating the control section 11. When an image file is selected, an image is displayed on the LCD 10 on the basis of the selected image file. When a sound record file is selected, a specific image 25 prepared for the sound reproduction and a file number 26 assigned to the selected sound record file are displayed as a specific indicia to this sound file on the LCD 10, as shown in FIG. 3. The file number 26 is what is contained in a sound file name of the selected sound selected sound record file. It is possible to display a file number of the selected image file on the LCD 10 for a limited time with the image. When a sound play command is entered while the specific image 25 is displayed on the LCD 10, the sounds stored as the selected sound record file, i.e. the sound file with the displayed file number 26, are reproduced.

If the selected image file is associated with a sound file, i.e. a sound memo file, the sounds stored as the sound memo file are reproduced in response to a sound play command entered while the image of the selected image file is displayed on the LCD 10.

If a delete command is entered while an image is displayed on the LCD 10, the image file of that image is deleted from the memory card 16. If a sound memo file is stored in association with that image file, the sound memo file is also deleted. In the same way, if the delete command is entered while the specific image 25 is displayed on the LCD 10, the sound record file with the displayed file number 26 is deleted from the memory card 16.

Figure 4:
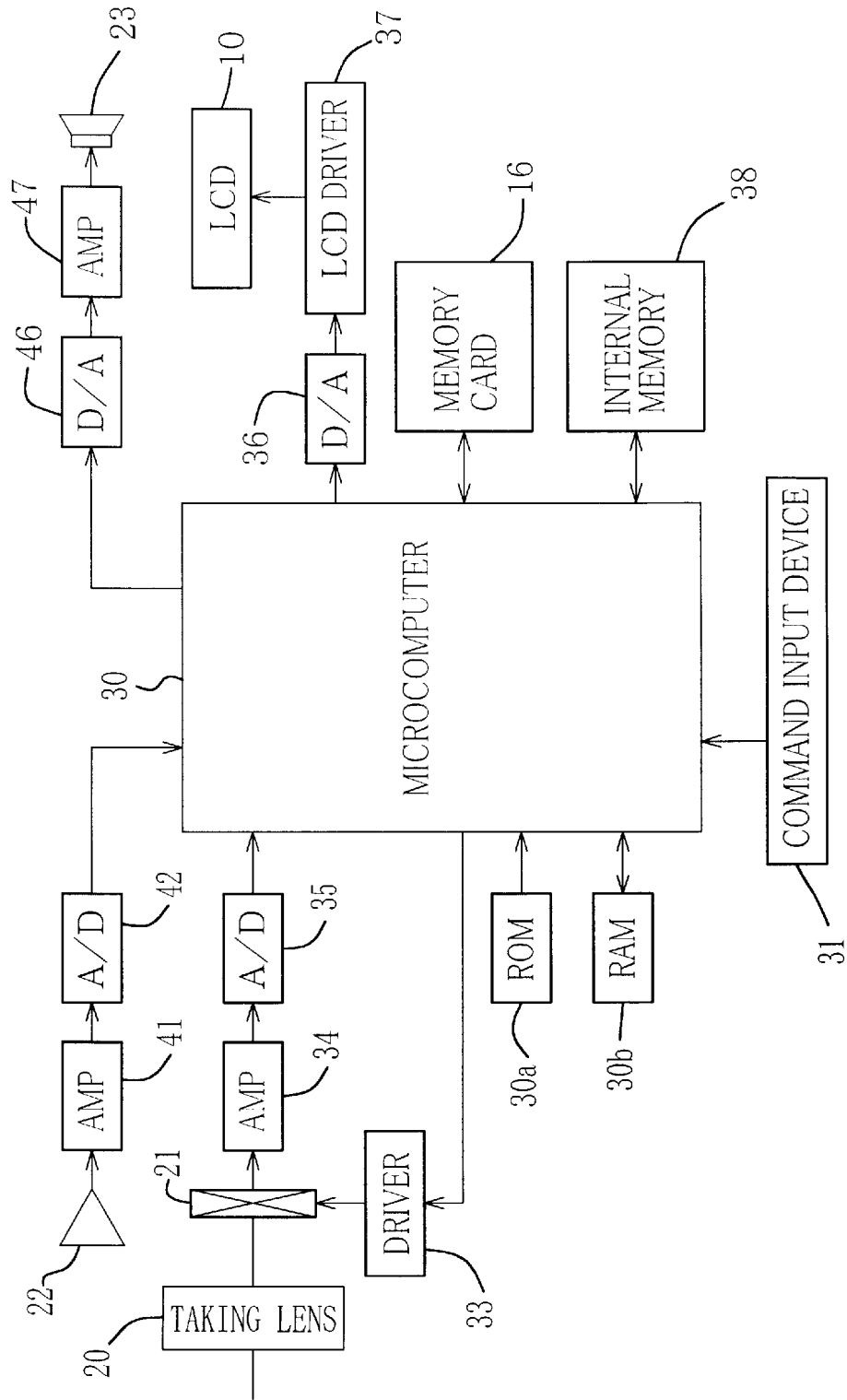
FIG. 4 shows a block diagram illustrating an electric structure of the digital camera.
Figure 6:
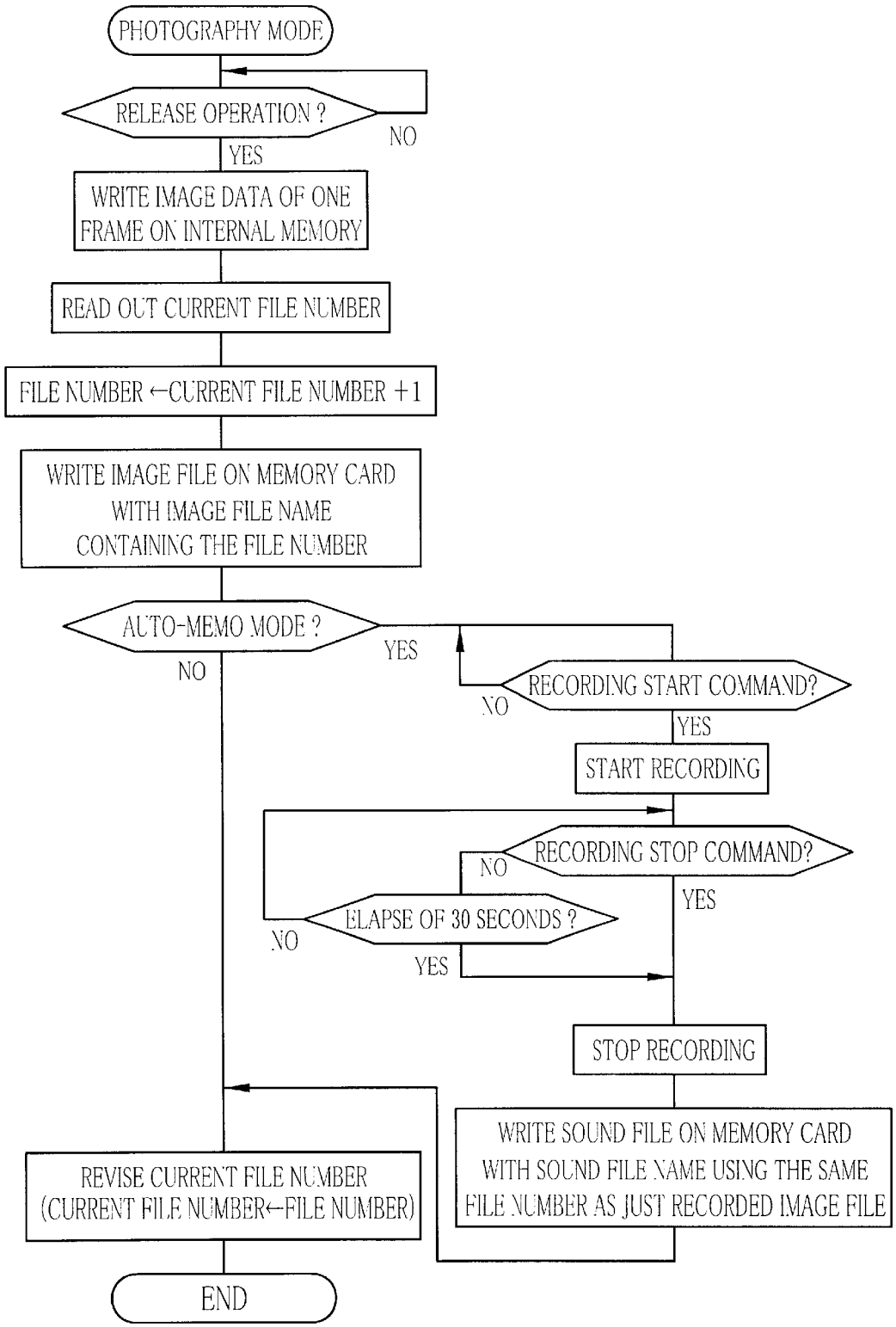
FIG. 6 shows a flow chart illustrating an operation sequence in a photography mode of the digital camera.

Referring to FIG. 4 illustrating the electric structure of the digital camera, a microcomputer 30 controls respective elements of the digital camera and reads or writes the memory card 16 in accordance with commands entered through a command input device 31 that consists of the release button 7 and the control section 11.

A ROM 30a and a RAM 30b are connected to the microcomputer 30. The ROM 30b stores sequence programs for controlling the digital camera and those for writing an image file or a sound file on the memory card 16. So the microcomputer 30 operates according to the sequence programs stored in the ROM 30b. The RAM 30b is used as a work memory for temporarily storing data necessary for executing the sequence program.

The CCD image sensor 21 successively converts optical images of subjects, that are formed on a photoreceptive surface of the CCD image sensor 21 through the taking lens 20, into electric signals. Micro filters for three-color separation of the optical image are arranged in a matrix on the photoreceptive surface of the CCD image sensor 21, so the CCD image sensor 21 outputs red, green and blue color signals separately from one color to another in a serial fashion. Each color signal is amplified through an individual amplifier 34, and is converted through an individual A/D converter 35 into a digital form. Thus, image data consisting of luminance data and color-difference data is obtained.

The microcomputer 30 processes the image data for improving image quality, like adjusting white-balance, making gamma-correction and the like, and also interpolate the image data to produce image data of one frame. In the photography mode, the processed image data is sent sequentially to an LCD driver 37 via a D/A converter 36, so the LCD 10 displays moving images of the subjects photographed through the CCD image sensor 21.

When the release button 7 is pressed in the photography mode, the microcomputer 30 initially writes the image data of one frame that corresponds to an optical image formed at that moment on the CCD image sensor 21, on an internal memory 38, and thereafter compresses the image data on the internal memory 38, before storing it as an image file on the memory card 16.

Sound signals output from the microphone 22 are amplified through an amplifier 41 and converted into digital sound data through an A/D converter 42. The microcomputer 30 initially writes the sound data obtained through a recording session as a sound file on the internal memory 38, and then writes it on the memory card 16. The memory card 16 should be initialized into a predetermined format. The digital camera can initialize the memory card 16 into the predetermined format after it is put in the card slot 15.

In the reproduction mode, the microcomputer 30 reads out the image file or the sound file from the memory card 16, and writes it on the internal memory 38. Then, the microcomputer 30 sequentially reads out the image data from the image file on the internal memory 38, and sends them to the LCD driver 37 via the D/A converter 36, so the LCD 10 displays an image on the basis of the image data read out from the memory card 16. When the microcomputer 30 reads out the sound data from the sound file on the internal memory 38, the sound data is sent to a D/A converter 46, and is converted back to the sound signals. The sound signals, after being amplified through an amplifier 47, are sent to the speaker 23, reproducing the recorded sounds.

When a sound record file is selected, the microcomputer 30 reads out the sound record file from the memory card 16, and simultaneously sends image data of the specific image 25 to the D/A converter 36, so the LCD 10 displays the specific image 25. The image data of the specific image 25 is previously written on the ROM 30a.

The microcomputer 30 gives an image file name to an individual image file, or a sound file name to an individual sound file. The image file name consists of a file-name and an extender specific to the image file, wherein the file-name has a predetermined form and contains an individual file number, whereas the extender is commonly used for any image file.

Figure 5:
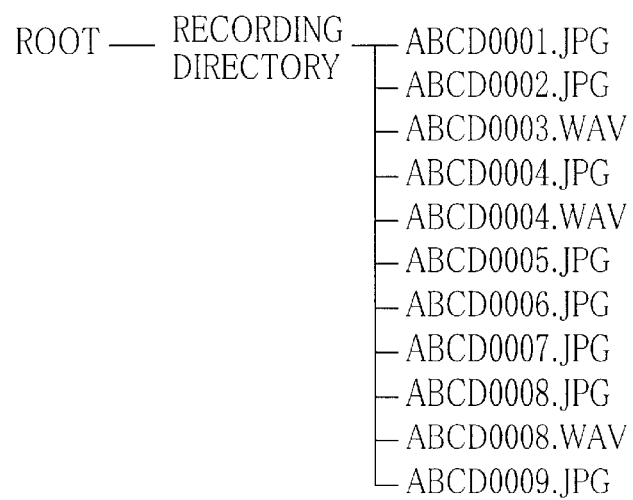
FIG. 5 shows an explanatory diagram illustrating a data recording condition on a memory card.

An example of the image file name is "ABCDXXXX.JPG", wherein "ABCDXXX" constitute the file-name, and "JPG" constitute the extender common to the image file. In the same way, the sound file name consists of a file-name and an extender specific to the sound file, wherein the file-name has a predetermined form and contains an individual file number, whereas the extender is commonly used for any sound file. An example of the sound file name is "ABCDXXXX.WAV", wherein "ABCDXXX" constitute the file-name, and "WAV" constitute the extender common to the sound file. In the respective file-names, "ABCD" constitute a predetermined code commonly used for the image files and the sound files, and "XXXX" constitute the file number. The file number "XXXX" is a four-digit number among "0001" to "9999". As shown in FIG. 5, the image files and the sound files are written in a recording directory that is formed underneath a highest significant directory of the memory card 16.

The RAM 30b stores the latest-used file number as a current file number, that is the file number used in the file-name given to the latest image file or the latest sound record file written on the memory card 16. When an image file or a sound record file is newly produced and written on the memory card 16, the microcomputer 30 produces a new file-name from the predetermined code "ABCD" and a file number that is obtained by adding "1" to the current file number stored in the RAM 30b. Then the microcomputer 30 gives the newly produced image file an image file name consisting of the new file-name and the common extender to the image file, or gives the newly produced sound record file a sound file name consisting of the new file-name and the common extender to the sound file.

In this way, the image files and the sound record files are given their individual file numbers, that serve as serial numbers corresponding to the time sequence of their recording. Once a file number is given to an image file or a sound record file, the file number will never be used even after the assigned image or sound record file is deleted. When recording a sound memo file, the microcomputer 30 gives the sound memo file a sound file name that consists of the same file-name as given to the associated image file and the extender common to the sound file. The sound memo file is then recorded in the same recording directory as the associated image file. Accordingly, the sound memo file associated with the selected image file is identified with ease, without the need for recording data of linkage between the image file and the sound memo file, or analyzing the linkage data for the reproduction.

Though the image files and the sound record files are both written in the recording directory on the memory card 16, as shown in FIG. 5, the microcomputer 30 can discriminate between the image file and the sound record file with reference to the extender. The microcomputer 30 can also discriminate between the sound record file and the sound memo file, because if there is an image file having the same file-name as a sound file has, the sound file is determined as a sound memo file associated with that image file. If there is not an image file having the same file-name as a sound file has, the sound file is determined as an independent sound record file.

The microcomputer 30 controls the sequence of selection and reproduction of the image files and the sound files on the basis of the file numbers contained in the image file names and the sound file names.

It is to be noted that the extender "JPG" for the image file represents that the image file is stored in the JPEG format, and that the extender "WAV" for the sound file represents that the sound file is stored in the WAV format. Accordingly, if the image file or the sound file is stored in another format, the extender would be modified according to that format. The file-name may also have another form insofar as it contains a file number.

Now the operation of the digital camera having the above structures will be described in more detail with reference to FIGS. 6 to 10.

When the digital camera is powered, the user is first required to select an operation mode by operating the control section 11, from among the photography mode, the sound recording mode and the reproduction mode. The switching between these operation modes may be done at appropriate timing by operating the control section 11.

In the photography mode, image data of subjects photographed through the CCD image sensor 21 is successively sent to the microcomputer 30 and, after being processed in the microcomputer 30, the image data is supplied to the LCD driver 37 via the D/A converter 36, driving the LCD 10 to display moving images of the subjects in a real time fashion.

To record the subject image as an image file, the user chooses between the ordinary mode and the auto-memo mode in the photography mode, and then presses the release button 7 while framing a scene with reference to the moving images on the LCD 10 or by looking through the optical finder 5. Then the image data of one frame that corresponds to an optical image formed at that moment on the CCD image sensor 21 is first written on the internal memory 38, and then compressed as an image file. Thereafter, the microcomputer 30 reads the current file number from the RAM 30b, and obtain a new file number by adding "1" to the current file number, and produces a new image file name from a file-name containing the new file number and the extender "JPG" for the image file. Then the newly produced image file is written with the new image file name in the recording directory on the memory card 16.

Thereafter, the microcomputer 30 checks if it is the auto-memo mode. If not, the new file number is stored as the current file number on the RAM 30b, updating the current file number, and then the sequence for the photography is terminated, and the microcomputer 30 is reset to a standby condition for another operation on the release button 7.

For example, where the stored current file number is "0005", the new file number becomes "0006", so the new image file name given to the new image file becomes "ABCD0006.JPG". Thereafter, the current file number is revised as "0006". The next time the release button 7 is pressed, an image file is written in the recording directory on the memory card 16 in the same way as set forth above, and the image file name "ABCD0007.JPG" is given to this image file.

If the auto-memo mode is designated in the photography mode, the digital camera automatically moves on to the sound memo mode as a sub mode under the photography mode. In the sound memo mode, the user may start recording sounds by operating the control section 11. For example, the user may record voices explaining the subject recorded as the image file by talking to the microphone 22 through the holes 9. The voices or sounds are converted into sound data through the microphone 22 and the A/D converter 42, and the sound data is written sequentially on the internal memory 38. When a stop command is entered through the control section 11, or in 30 seconds after the start of recording, the recording of the sounds is terminated.

The sound data taken at one recording session in the sound memo mode is regarded as a sound memo file. When the sound memo file is written in the recording directory on the memory card 16, the microcomputer 30 gives the sound memo file a sound file name that consists of the same file-name as that is given to the image file produced immediately before the sound memo file, and the common extender "WAV" to the sound file. After the sound memo file is written on the memory card 16, the current file number on the RAM 30b is updated, and the microcomputer 30 is reset to the standby condition for another operation on the release button 7.

For example, where the image file recorded on the memory card 16 in the auto-memo mode has an image file name "ABCD0008.JPG", the sound file name of the sound memo file to be recorded in association with that image file will be "ABCD0008.WAV".

Figure 7:
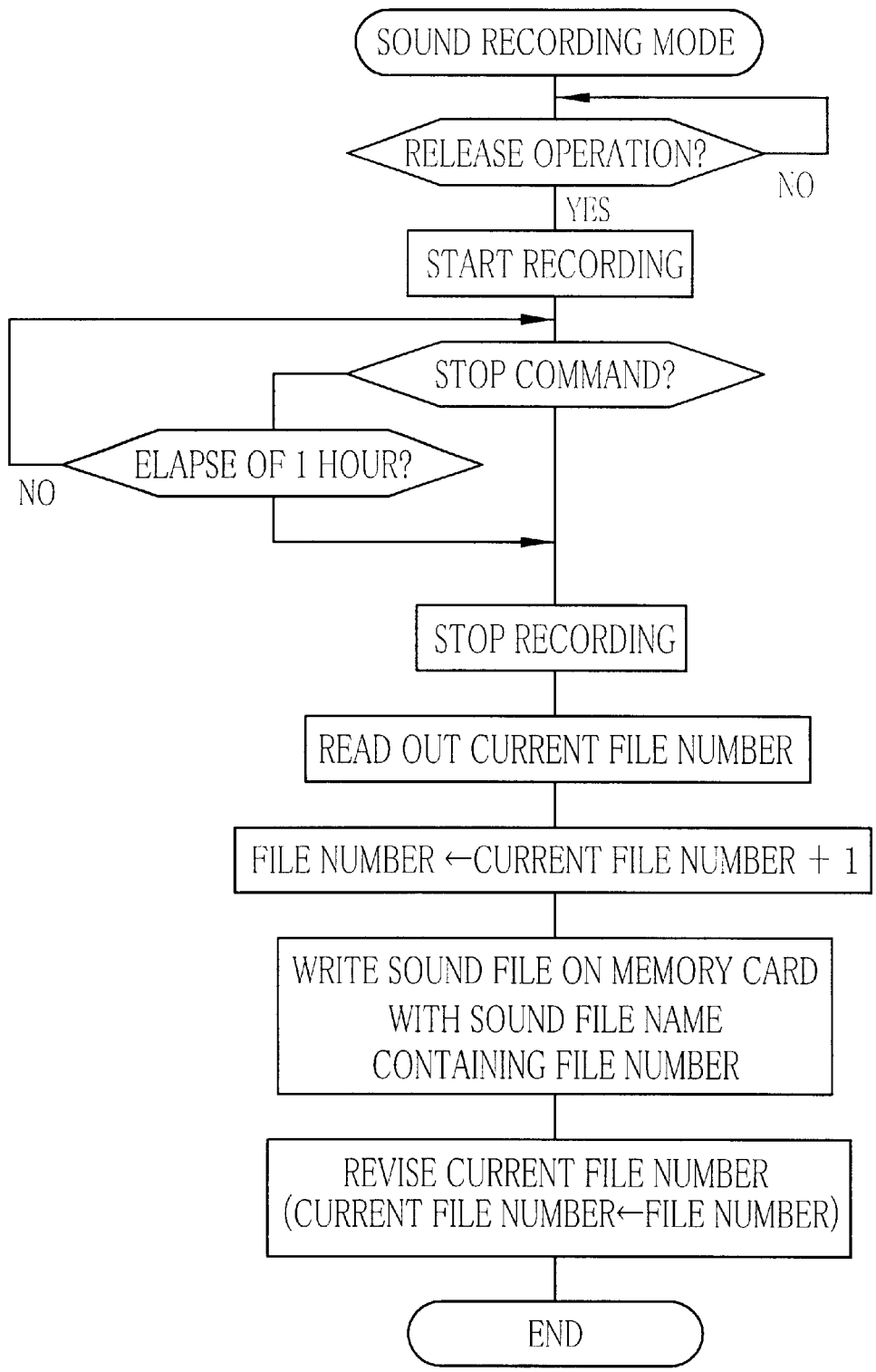
FIG. 7 shows a flow chart illustrating an operation sequence in a sound recording mode of the digital camera.

In order to record a sound file independently, i.e. as a sound record file, the user should select the sound record mode by operating the control section 11. In the sound record mode, recording of sounds starts when the user presses the release button 7, as shown in FIG. 7. Then sounds entering through the microphone 22 are written as sound data on the internal memory 38. When the user presses the release button 7 once again in the sound recording mode, or in 1 hour after the start of the recording session, the recording session is terminated.

The sound data taken at one recording session in the sound recording mode is regarded as a sound record file. Then, the microcomputer 30 reads the current file number from the RAM 30b, and obtain a new file number by adding "1" to the current file number, and produces a new sound file name from a file-name containing the new file number and the common extender "WAV" to the sound file. The sound record file is then written in the recording directory on the memory card 16, under the new sound file name. After the sound record file is written on the memory card 16, the current file number on the RAM 30b is updated, and the microcomputer 30 is reset to the standby condition for another operation on the release button 7.

For example, where the stored current file number is "0010", the new file number becomes "0011", so the new sound file name given to the new sound file becomes "ABCD0011.WAV". Thereafter, the current file number is revised as "0011".

As described so far, the file numbers contained in the file names of the image files and the sound record files becomes the greater the later the time or date of recording these files. Consequently, the image files and the sound record files as recorded in the recording directory certainly have different file-names from each other, and it is easy to select and reproduce the image files and the sound record files in a time-sequential fashion in the reproduction mode without increasing the load of data-processing on the microcomputer 30.

Figure 8:
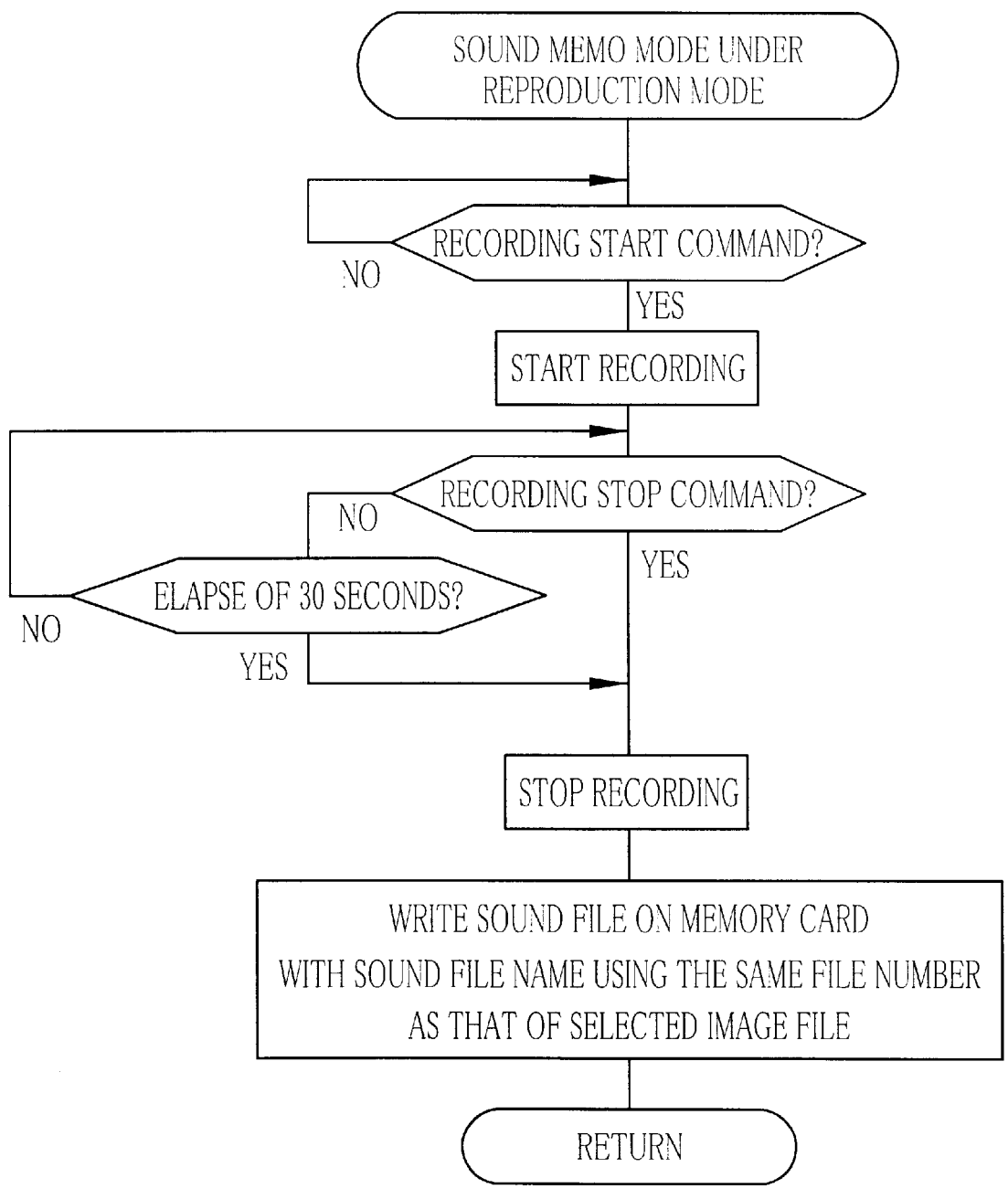
FIG. 8 shows a flow chart illustrating an operation sequence in a sound memo mode as selected in a reproduction mode of the digital camera.

It is possible to record sounds afterward in association with an appropriate one of previously stored image files. For this purpose, the sound memo mode is designated by operating the control section 11 while an image of the appropriate image file is displayed or reproduced on the LCD 10 in the reproduction mode. When the sound memo mode is designated in the reproduction mode, as shown in FIG. 8, the microcomputer 30 is set to a standby condition for a recording start command, and starts recording sounds when the user enters the recording start command through the control section 11. Then sounds taken through the microphone 22 are converted into sound data, and stored in the internal memory 38. The sound data obtained through a recording session in the sound memo mode under the reproduction mode is written as a sound file, strictly as a sound memo file, on the memory card 16. At that time, the microcomputer 30 gives the sound memo file a sound file name that is constituted of the same file-name as that is used in the image file name of the appropriate image file, and the common extender "WAV" to the sound file.

For example, where the image file selected for the sound memo mode under the reproduction mode has an image file name "ABCD0015.JPG", the sound file name of the sound memo file to be recorded in association with that image file will be "ABCD0015.WAV". If there is already a sound memo file having the same sound file name as the newly produced sound memo file in the sound memo mode under the reproduction mode, the sound memo file is rewritten as the new one.

Since a sound memo file and an image file are associated with each other by giving the same file-name to both of them, and the sound memo file is discriminated from the image file by using different extender from each other, it becomes unnecessary to record data of correlation between these image file and sound memo file, or data of discrimination between these files. Thus, the data volume and the load on the microcomputer 30 are efficiently reduced. Because the image file name or the sound file name is inevitable to each file for identifying the respective files, the image file name or the sound file name itself would not redundantly use the capacity of the memory card 16.

Figure 9A:
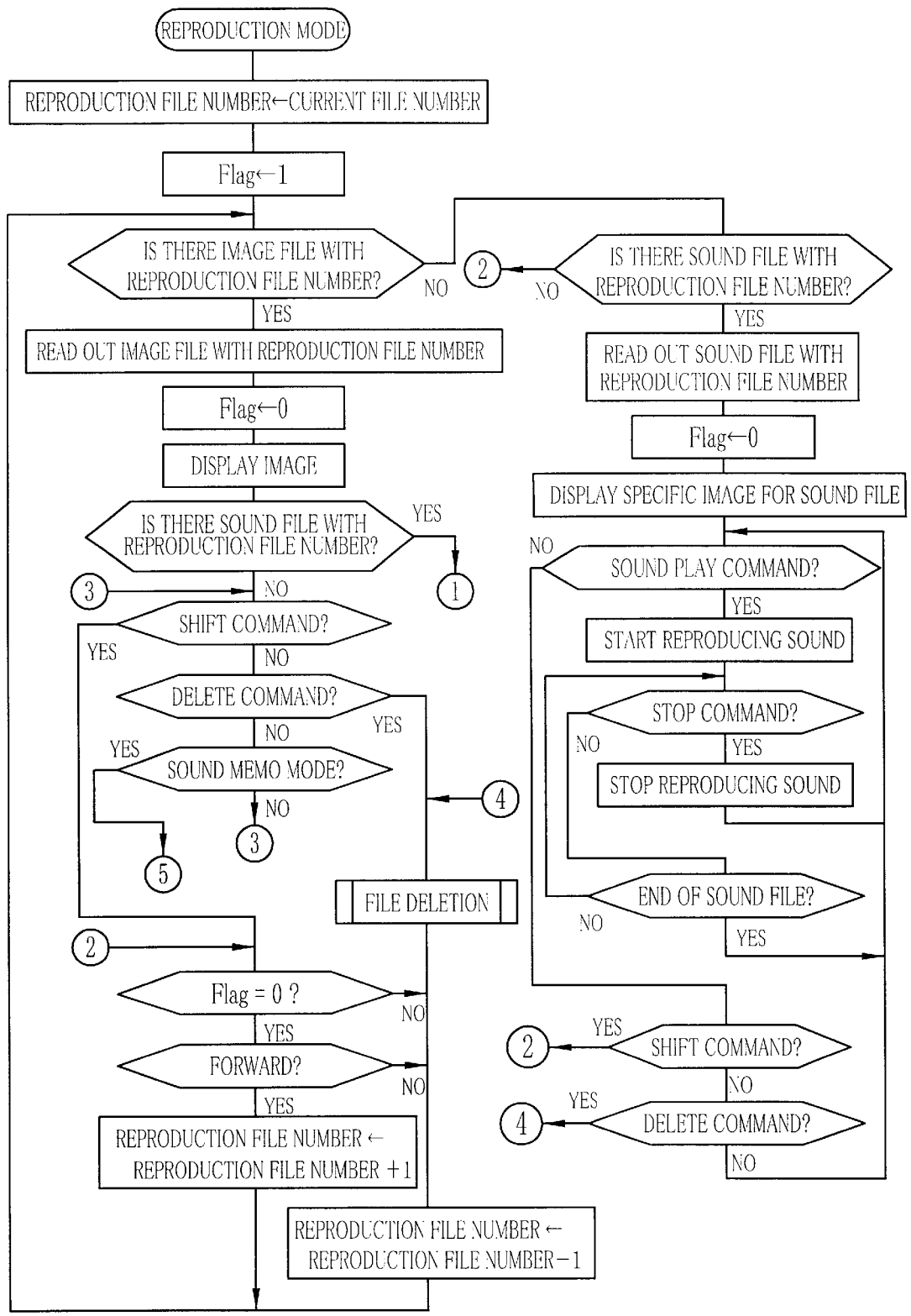
FIGS. 9A and 9B show a flow chart illustrating an operation sequence in the reproduction mode.
Figure 9B:
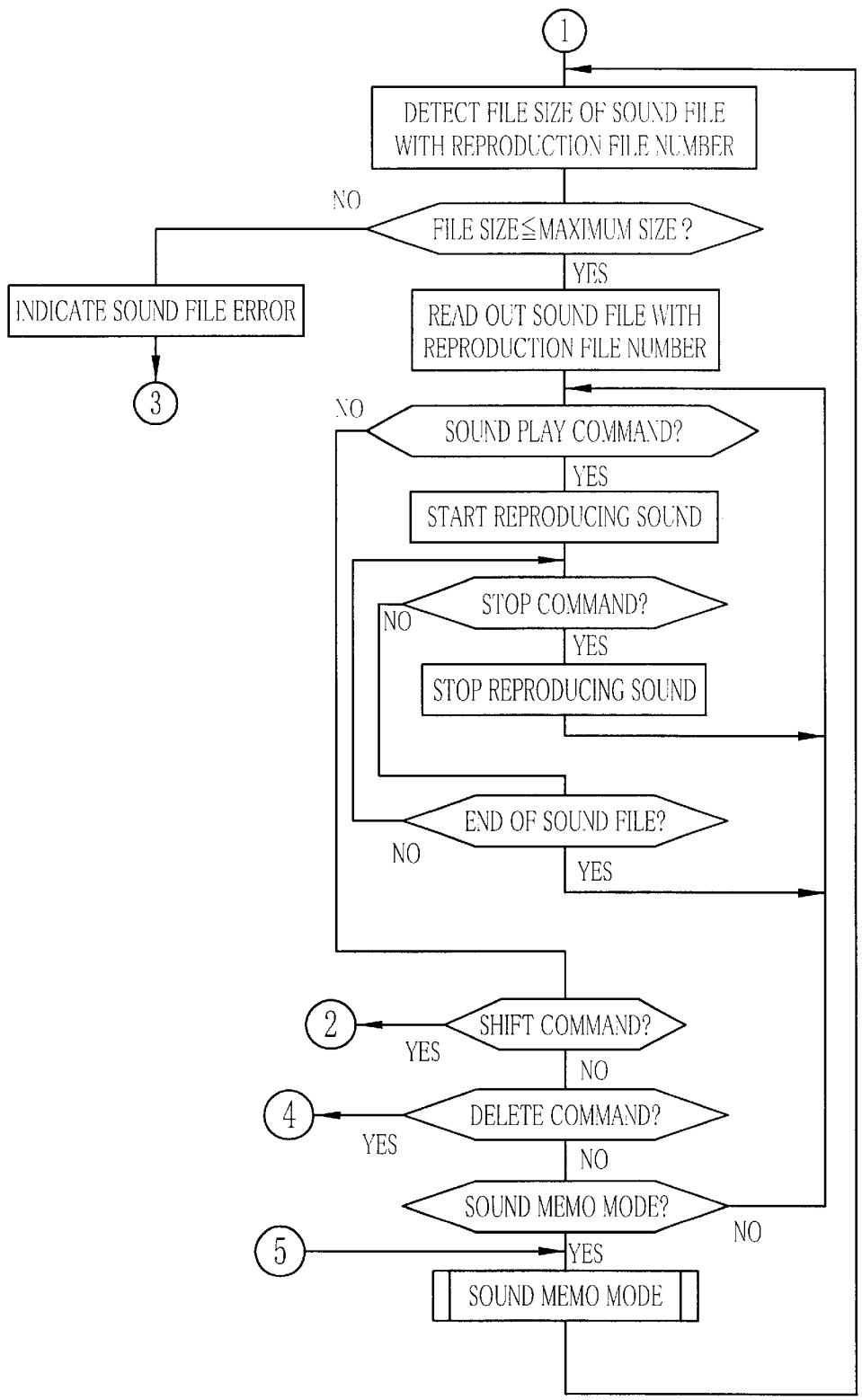

To reproduce the image file or the sound file from the memory card 16, the user sets the digital camera to the reproduction mode by operating the control section 11. Then, as shown in FIG. 9, the microcomputer 30 reads outs the current file number from the RAM 30b, and regards the current file number as a reproduction file number, and checks if there is an image file in the recording directory on the memory card 16, whose image file name contains the reproduction file number. When such an image file is not recorded on the memory card 16, the microcomputer 30 checks if there is a sound file in the recording directory on the memory card 16, whose sound file name contains the reproduction file number.

When there are not any files on the memory card 16 that contain the same file number in their file-names as the reproduction file number, the microcomputer 30 checks if there is an image file or a sound file on the memory card 16, whose file-name contains a file number that is obtained by subtracting "1" from the initial reproduction file number. When there are not any files on the memory card 16 that contain that file number in their file-names, the microcomputer 30 checks if there is an image file or a sound file on the memory card 16, whose file-name contains a file number that is obtained by subtracting "2" from the initial reproduction file number. In this way, the microcomputer 30 searches for an image file or a sound file whose file-name contains the file number coincident with the reproduction file number while reducing the reproduction file number one by one.

When the file with the file-name containing the reproduction file number is an image file, an image is displayed on the LCD 10 on the basis of this image file. Thereafter, the microcomputer 30 searches for a sound file having the same file-name as the reproduced image file has. If there is not such a sound file, the microcomputer 30 is set to a waiting condition for a command to the sound memo mode, for the delete command to delete the reproduced image file, or a shift command to shift to a next file.

If the microcomputer 30 finds a sound file having the same file-name as the reproduced image file, the microcomputer 30 checks if the sound file has a file size that is less than a normal file size for the sound memo file that corresponds to the recording time of 30 seconds. If so, the microcomputer 30 regards the sound file as the sound memo file associated with the reproduced image file, and reads out the sound memo file from the memory card 16, to write it on the internal memory 38. Then, an indicia is displayed on the image on the LCD 10, indicating that there is a sound memo file associated with the reproduced image file. Thereafter, the microcomputer 30 is set to the waiting condition for a command to reproduce the sounds, the command to the sound memo mode, the delete command, or the shift command. When the command to reproduce the sounds is entered in this condition, the sound data is sequentially read out from the sound memo file on the internal memory 38, and sent to the D/A converter 46, so the sounds recorded in association with the presently displayed image are reproduced through the speaker 23.

In this way, the microcomputer 30 has only to compare the sound file name with the image file name in order to check the correlation between the sound file and the image file. Thus the load of data processing on the microcomputer 30 necessary for this process is very small.

If the file size of the sound file having the same file-name as the reproduced image file is greater than the normal file size of the sound memo file, the microcomputer 30 judges this sound file to be a defective one, and executes an error processing, like displaying an indicia to indicate that the sound file is defective on the LCD 10, and leaving that sound file on the memory card 16.

When the file with the file-name containing the reproduction file number is a sound file, the microcomputer 30 checks if there is an image file having the same file-name as this sound file has. If there is not such an image file, the microcomputer 30 judges the sound file as a sound record file. Then, the sound record file is read out from the memory card 16 and is written on the internal memory 38. Simultaneously, the microcomputer 30 reads out the image data of the specific image 25 for the sound record file, to display the specific image 25 on the LCD 10. Also the file number 26 of the presently read-out sound record file is displayed on the LCD 10. In this way, the microcomputer 30 can identify the sound files as the sound record files if only there are not any image files having the same file-name as this sound file has. Thus the load of data processing on the microcomputer 30 for this process is also very small.

Thereafter, the microcomputer 30 is set to the waiting condition for a command to reproduce the sounds, the command to the sound memo mode, the delete command, or the shift command. When the command to reproduce the sounds is entered in this condition, the sound data is sequentially read out from the sound record file on the internal memory 38, and sent to the D/A converter 46, so the sounds recorded in the sound recording mode are reproduced through the speaker 23.

The shift command includes the shifting direction. When the shift command is entered through the control section 11 while an image of an image file or the specific image 25 for the sound record file is displayed, and if the shifting direction designated by the shift command is backward, the microcomputer 30 searches for an image file or a sound file having a file number that is obtained by subtracting "1" from the file number of the presently reproduced file. If there is not such a file on the memory card 16, the microcomputer 30 searches for a next file using a reproduction file number that is reduced one by one in the same way as for the first stage of the reproduction mode. If the shifting direction is forward, the microcomputer 30 searches for an image file or a sound file having a file number following to the file number of the presently reproduced file in the order from the smaller to the larger number.

Figure 10:
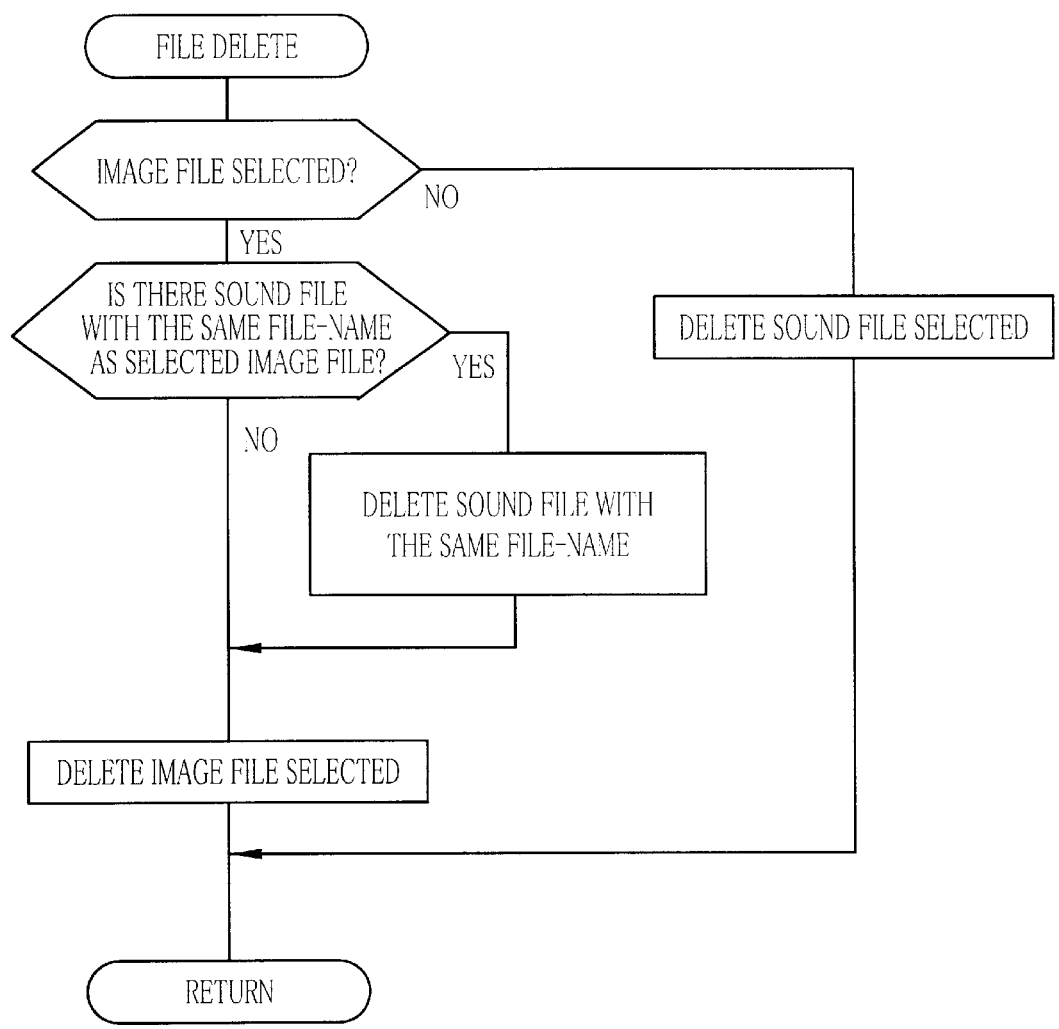
FIG. 10 shows a flow chart illustrating an operation sequence for deleting a file.

To delete an image file, the user selects the image file in the reproduction mode, and enters the delete command while the image of the selected image file is displayed. Then, as shown in FIG. 10, the microcomputer 30 deletes the selected image file and, at the same time, checks if there is a sound memo file on the memory card 16 that has the same file-name as the deleted image file has. If there is, the sound memo file is also deleted. In this way, the sound memo file associated with the deleted image file is automatically deleted. To delete a sound record file, the user enters the delete command while the file number of that sound record file and the specific image 25 are displayed on the LCD 10.

Figure 11:
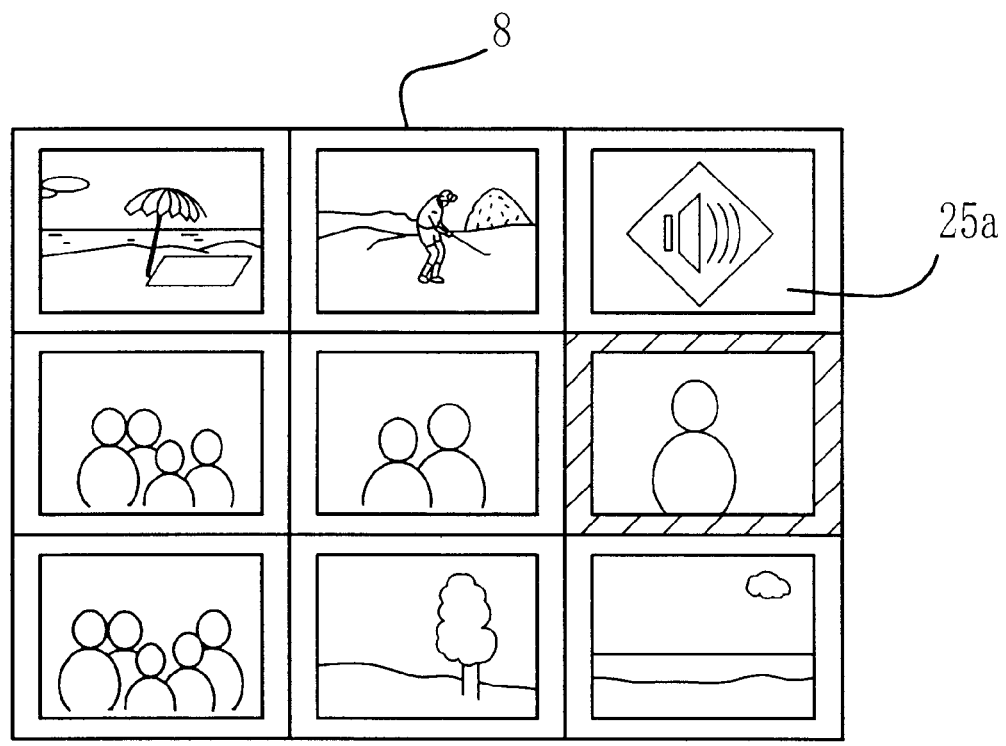
FIG. 11 shows an explanatory diagram illustrating a display condition in a thumbnail mode as selected in a reproduction mode, according to another embodiment of the present invention.

It is possible to provide the digital camera with a thumbnail mode under the reproduction mode. In the thumbnail mode, as shown in FIG. 11, a plurality of thumbnails, i.e. images reduced in size and pixel number from the images recorded on the memory card 16, are displayed in a matrix on the LCD 10 in a designated sequence, e.g. in the sequence from the early recorded one to the later recorded one, that is, in the order from the smaller file number to the larger file number. In the example shown in FIG. 11, a thumbnail 25*a* is displayed in a position corresponding to a sound record file. The user may selects an image file or a sound file with reference to the thumbnails on he LCD 10.

In the above embodiment, image files and sound files are recorded in the recording directory that is disposed underneath the highest significant directory of the memory card, the memory card having a different structure of directories is applicable to the present invention. For example, the highest significant directory of the memory card may be used as the recording directory.

Figure 12:
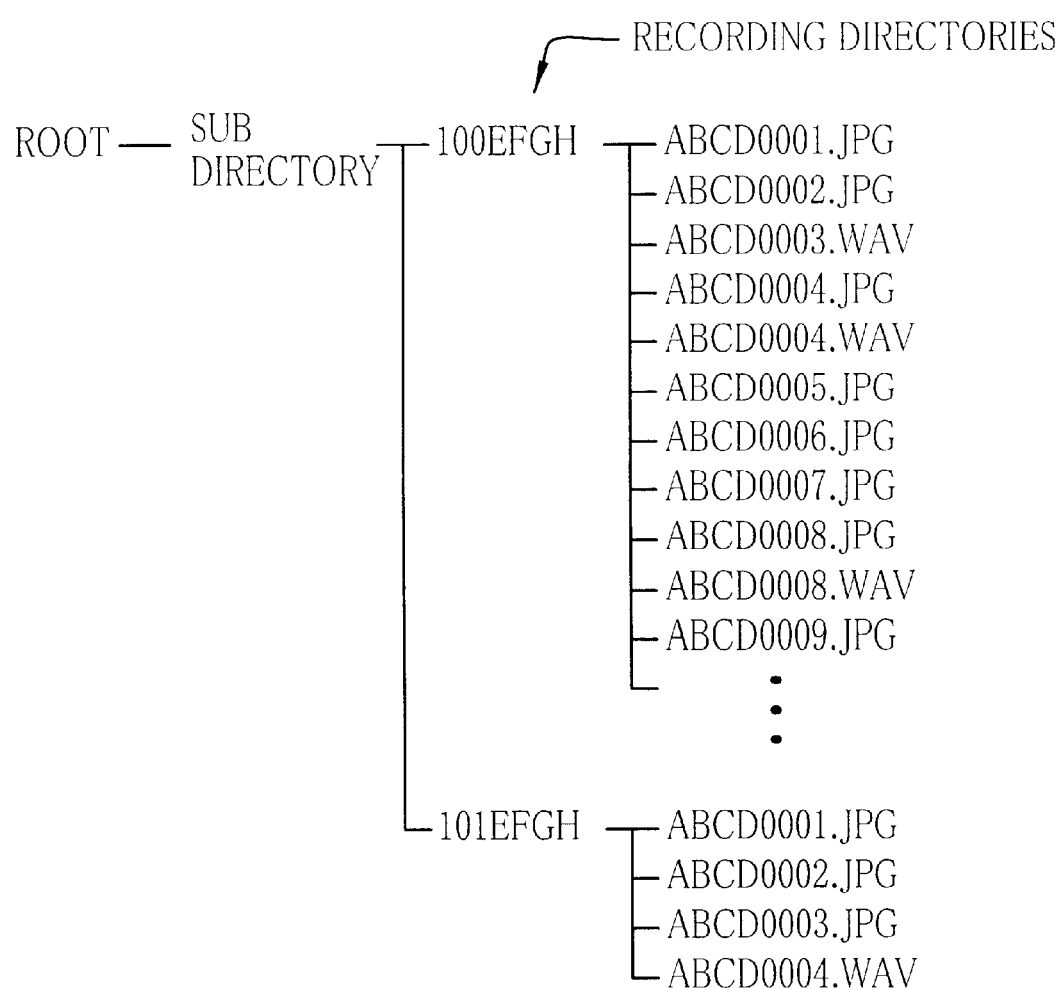
FIG. 12 shows an explanatory diagram illustrating a data recording condition on a memory card according to a further embodiment of the present invention, wherein a plurality of recording directories are produced on the memory card.

FIG. 12 shows an embodiment of a directory structure of a memory card, wherein a plurality of recording directories are produced in a sub-directory that is disposed underneath the highest significant directory and provided with a predetermined name. According to this embodiment, when the largest file number of the files stored in a recording directory or the current file number stored in the RAM 30*b* reaches the maximum limit, e.g. "9999", a second recording directory is produced, so the image file or the sound file produced hereinafter will be recorded in the second recording directory, while being allocated a file number restarting from the minimum value, e.g. "0001".

In the embodiment using a plurality of recording directories, as shown in FIG. 12, if a sound memo file is to be associated with an image file, the sound memo file is given the same file-name as the image file, in the same way as in the first embodiment, and is recorded in the same recording directory as that image file, regardless of which recording directory is presently used for recording image files and sound record files. Accordingly, if there are a sound file and an image file that have the same file-name in the same recording directory, these two files are processed as correlated files. On the contrary, if there is not an image file that has the same file-name as a sound file in the same recording directory, the sound file is regarded as a sound record file.

For instance, in order to record a sound memo file in association with an image file "ABCD0002.JPG" recorded in a first recording directory "100EFGH", the sound memo file is given a sound file name "ABCD0002.WAV" and is recorded in the first recording directory "100EFGH". Since there are an image file "ABCD0004.JPG" and a sound file "ABCD0004.WAV" in the first recording directory "100EFGH", the sound file having the same file-name "ABCD0004" as the image file "ABCD0004.JPG" is processed as a sound memo file associated with the image file "ABCD0004.JPG". On the other hand, a sound file "ABCD0004.WAV" stored in a second recording directory "101EFGH" is processed as a sound record file, because there is not an image file having the same file-name "ABCD0004" as this sound file in the second recording directory "101EFGH".

It is preferable to give each recording directory a directory name containing a directory number, e.g. "100", "101" and so on, as a serial number representative of the time sequence of production of the directories. Then, with reference to the directory numbers and file numbers, it becomes easy to reproduce the image files and the sound files stored in the plurality of recording directories in a time sequential fashion, e.g. from the later recorded file to the early recorded one, or vise versa.

Although the present invention has been described with respect to the illustrated embodiments, the present invention is not to be limited to the embodiments. For instance, although the image file contains image data of one frame as a still image in the above embodiment, the present invention is applicable to a digital camera that may record image data of a series of frames as a movie file. In that case, the movie file may be given a file-name in the same way as for the image file, and an extender specific to the move files should be attached to the file-name of the movie file. It is possible to record a sound memo file in association with the movie file, while giving the same file-name as the movie file in the same way as for the image file.

Although the specific indicia to the sound record file is displayed only while the sound record file is selected in the reproduction mode in the above embodiment, it is possible to display a specific indicia while sound data is being recorded as a sound record file or a sound memo file.

Although the release button is used for starting and stopping reproducing the sound record file in the above embodiment, it is possible to enter a sound play command and a stop command through a control key provided in the control section, like when reproducing the sound memo file.

Thus, various modifications will be possible to those skilled in the art without departing from the scope of claims appended hereto.

What is claimed is:

1. A data processing method for a digital camera that may record image data as image files and sound data as sound files on a storage medium, wherein sound files comprise a sound memo file recorded in association with an image file, and a sound record file recorded independently, wherein a sound memo file to be associated with a designated image file is given a same file-name as said designated image file, and is attached with an extender common to the sound files, and is recorded in a same recording directory on said storage medium as said designated image file is recorded.

2. A data processing method as recited in claim 1, wherein when an image file is selected from among files stored in a recording directory on a storage medium, a sound file having the same file-name as said selected image file has is automatically searched for among those files stored in the same recording directory, and is read out as a sound memo file associated with said selected image file.

3. A data processing method as recited in claim 2, further comprising steps of:
   checking a file size of said sound file having the same file-name as said selected image file before said sound file being read out; and
   processing said sound file as a defective one if said file size is more than a maximum size predetermined for sound memo files.

4. A data processing method as recited in claim 2, wherein when a delete command is entered while an image is displayed on a display device of said digital camera on the basis of said selected image file, said selected image file is deleted and, if any, said sound memo file associated with said selected image file is also deleted automatically.

5. A data processing method for a digital camera that may record image data as image files and sound data as sound files on a storage medium, wherein sound files comprise a sound memo file recorded in association with an appropriate image file and a sound record file recorded independently, said data processing method comprising steps of:
   determining a file number for a new image file such that said file number is not used for other image and sound files which are recorded in a recording directory on said storage medium;
   recording said new image file with an image file name in said recording directory, said image file name consisting of a file-name containing said file number in a predetermined format and a first extender common to any image files;
   determining a second file number for a new sound record file such that said file number is not used for other image and sound files which are stored in said recording directory;
   recording said new sound record file with a sound file name in said recording directory, said sound file name consisting of a file-name containing said second file number in the predetermined format and a second extender common to any sound files;
   recording a new sound memo file with a second sound file name in said recording directory, said second sound file name being obtained by attaching said second extender to a same file-name as that of an image file which said new sound memo file is to be associated with;
   discriminating between image files and sound files by the extenders attached to the file-names of these files;
   processing a sound file as a sound memo file when an image file having the same file-name as said sound file has is recorded in the same recording directory; and
   processing a second sound file as a sound record file when an image file having the same file-name as said second sound file has is not recorded in the same recording directory.

6. A data processing method as recited in claim 5, wherein a file number for a new image file or a new sound record file is obtained by adding "1" to a preceding file number that is given to the latest image file or the latest sound record file recorded in said recording directory.

7. A data processing method as recited in claim 6, wherein when said preceding file number reaches a predetermined maximum value, a predetermined minimum value is used as the file number for the new image file or the new sound record file, and said new file is recorded in a second recording directory on said storage medium.

8. A data processing method as recited in claim 5, further comprising steps of:
   displaying, when a sound record file is selected from among recorded files, a specific indicia to said selected sound record file on a display device that is used for reproducing images of image files; and
   deleting said selected sound record file when a delete command is entered while said specific indicia is displayed on said display device.

9. A data processing method as recited in claim 5, further comprising a step of displaying thumbnails of a plurality of files recorded in said recording directory on said storage medium in a sequence relating to the file numbers of said recorded files, wherein a specific thumbnail is displayed in a position corresponding to a sound record file.

10. A digital camera provided with a photography mode for recording image data as an image file, a sound memo mode for recording sound data as a sound memo file in association with an appropriate image file, a sound recording mode for recording sound data as a sound record file independently of image data, and a reproduction mode for reproducing images or sounds, wherein said digital camera switches automatically from said photography mode to said sound memo mode immediately after an image file is recorded while an auto-memo mode is selected in said photography mode, to permit recording sound data in association with the just recorded image file, and may also switch to said sound memo mode in said reproduction mode when a predetermined command is entered while an image of a selected image file is displayed on a display device, to permit recording sound data in association with said selected image file.

11. A digital camera as recited in claim 10, wherein a sound memo file to be associated with a designated image file is given a same file-name as said designated image file, and is attached with an extender common to the sound files, and is recorded in a same recording directory on said storage medium as said designated image file is recorded.

12. A digital camera as recited in claim 11, wherein when an image file is deleted, a sound memo file having the same file-name and being recorded in the same recording directory as said deleted image file is automatically deleted.

13. A digital camera as recited in claim 10, wherein when a sound record file is selected in said reproduction mode, a specific indicia to said selected sound record file is displayed on said display device.

14. A digital camera as recited in claim 13, wherein said selected sound record file is deleted when a delete command is entered while said specific indicia is displayed on said display device.

15. A digital camera as recited in claim 13, wherein sounds recorded as said selected sound record file begin to be reproduced in response to a pressing operation on a predetermined operation button while said specific indicia is displayed on said display device, and stop in response to a second pressing operation on said operation button.

16. A digital camera as recited in claim 10, wherein said digital camera is further provided with a thumbnail mode wherein thumbnails of a plurality of stored files are displayed on said display device, and a specific thumbnail is displayed in a position corresponding to a sound record file.

* * * * *